H. C. WILLIAMS.
CULTIVATOR.
APPLICATION FILED FEB. 26, 1918.
1,401,297.
Patented Dec. 27, 1921.
2 SHEETS—SHEET 1.
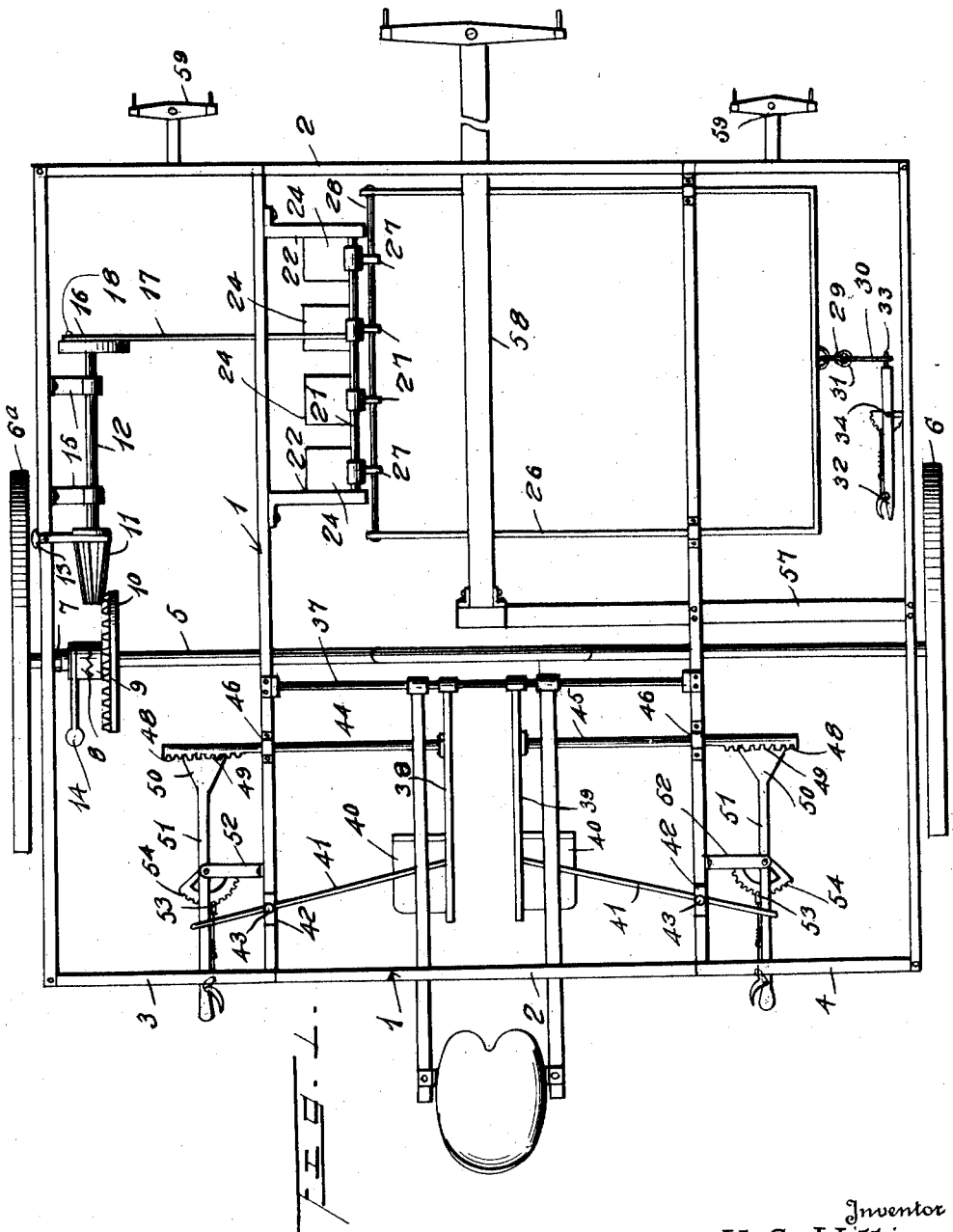
Inventor
H C. Williams.
Witnesses
By 
Attorney

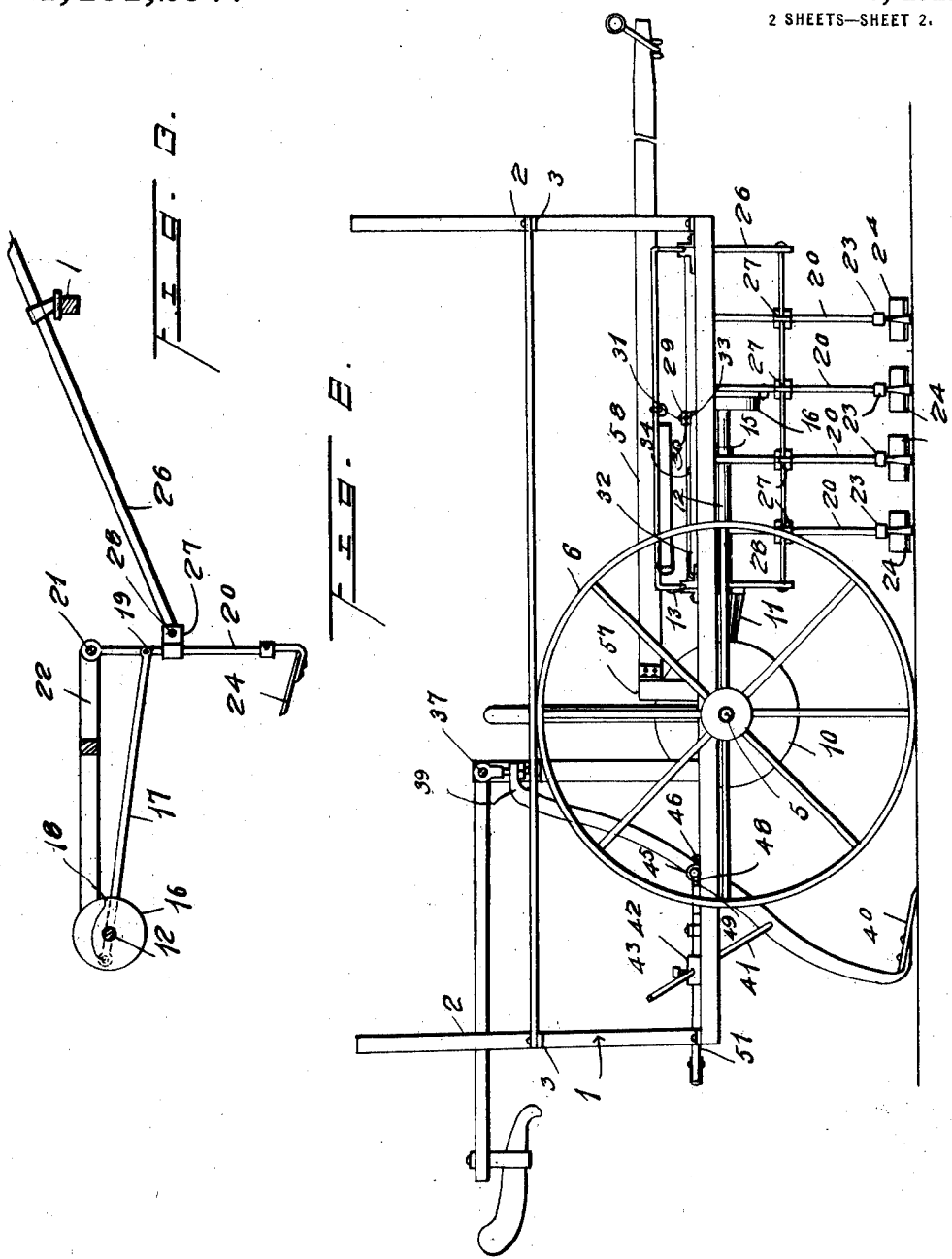

UNITED STATES PATENT OFFICE.

HENRY C. WILLIAMS, OF RAVINE, MISSISSIPPI.

CULTIVATOR.

1,401,297.  Specification of Letters Patent.  Patented Dec. 27, 1921.

Application filed February 26, 1918. Serial No. 219,240.

*To all whom it may concern:*

Be it known that I, HENRY CLAY WILLIAMS, a citizen of the United States, residing at Ravine, in the county of Noxubee and State of Mississippi, have invented certain new and useful Improvements in Cultivators; and I do hereby declare the following to be a full, clear, and exact description of the invention, such as will enable others skilled in the art to which it appertains to make and use the same.

This invention relates to agricultural implements of the cultivator type and the primary object of the invention is to provide an agricultural implement, particularly the kind for hoeing various kinds of crops such as corn, cotton or the like, which includes a plurality of pivotally mounted hoes which move transversely to the direction of travel of the cultivator for hoeing the ground between the hills of growing plants and further to provide means which is operable by the travel of the cultivator for swinging the pivoted hoes during operation of the cultivator.

A still further object of this invention is to provide a pair of cultivating shovels or scrapers which are positioned so that one will ride or travel upon each side of a row of growing plants rearwardly of the transversely movable hoes and further to provide a novel form of lever structure whereby said hoes may be moved laterally with respect to a row of growing plants, independently of each other.

A still further object of this invention is to provide means operable by the travel of the cultivator for swinging the transversely movable hoes.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawing, wherein like characters designate like and corresponding parts throughout the several views and in which:

Figure 1 is a top plan of the improved cultivator

Fig. 2 is a side elevation of the improved cultivator and

Fig. 3 is a fragmentary section through the cultivator showing the hoes and the manner of operating the same.

Referring more particularly to the drawings, 1 designates the main supporting frame of the cultivator structure, as an entirety, which supporting frame comprises a central arch portion 2 and side portions 3 and 4 which extend laterally from the lower ends of the arch portion 2, in horizontal plane.

The supporting frame 1 carries an axle 5, upon which is mounted the usual type of supporting wheels 6 and $6^a$ employed in cultivator construction, which wheels are rotatably mounted upon the axle. The wheel $6^a$ has a collar 7 connected thereto for rotation with the wheel upon the inner end of which collar is mounted a clutch section 8. The clutch section 8 is adapted for coaction with a clutch section 9 carried by the hub of crown gear 10. The gear 10 is rotatably mounted upon the shaft 5, and a cone gear 11 meshes therewith, which cone gear is carried by a shaft 12 for rotation therewith. A suitable hand lever 14 is provided for shifting the clutch section 8.

The shaft 12 is supported by suitable bearing brackets 15 and it has a disk 16 mounted upon its forward end. A rod 17 is eccentrically connected as shown at 18 to the disk 16, and it is connected as shown at 19 to one of the vertical supporting rods or handles 20 of the pivotally hung hoe structure. The hoe structure comprises the rods 20, the upper ends of which are mounted upon a rockably supported shaft 21 which shaft is rockably supported by suitable bearings 22. The rods 20 have hoe heads 23 carried by their lower ends to which blades 24 of the ordinary hoe construction are attached. The hoe blades 24 are positioned so that they will cut weeds between growing plants, such as corn, cotton or the like, during the operation of the machine, thereby eliminating the necessity of manually hoeing a growing crop.

A frame 26 is slidably supported by the supporting structure 1 and it is connected to the hoe carrying rods 20 by collars 27 which are pivotally connected to the frame 26 as shown at 28 so that when the cultivator is not in use, the frame 26 may be shifted for holding the hoes 24 raised out of an operative position, and prevent their engagement with the ground or with plants during the transportation of the cultivator from one field to another or from the field to the storage house.

The frame 26 has an arm 29 carried thereby to which a rod 30 is pivotally connected as shown at 31. The rod 30 is also connected to a hand lever 32 as shown at 33. A hand lever 32 is pivotally supported at 34, for pivotal movement in a horizontal plane so that by the pivotal movement of the hand lever the frame 26 may be held raised, for holding the hoe structure raised. The collars 27 are slidably mounted upon the rods 20, so as to permit of the necessary swinging movement of the hoe structure and when the frame 26 is shifted to raise the hoe structure, the collars will slide upwardly thereon until one of them strikes the pin 19 by means of which the rod 17 is connected to the rods 20 which will limit the upward movement of the collars and cause any further movement of the frame 26 to be imparted to the rods 20 of the hoe structure.

The supporting frame 1 has a rod 37 carried thereby, to which is connected a pair of beams 38 and 39. The beams 38 and 39 are connected to the rod 37 for vertical and lateral swinging or pivotal movement and they have scrapers or cultivating shovels 40 carried by their lower ends which travel upon each side of the row of growing plants.

Suitable guiding rods 41 are connected to the beams 38 and 39 and they extend upwardly through guiding collars 42 which are carried by the supporting frame 1. These rods are provided for holding the beams 38 and 39 at various adjusted elevations and the rods are held in adjusted position by set screws 43.

Horizontal transversely extending bars 44 and 45 are connected to the standards 38 and 39 respectively and they extend slidably through bearings 46 carried by the supporting frame 1. The bars 44 and 45 have their outer ends slightly curved and provided with rack teeth 48, which mesh with the rack teeth 49 formed upon the enlarged ends 50 of levers 51. The levers 51 are pivotally supported by suitable standards or supporting arms 52 and they have dog mechanism 53 carried thereby which coact with quadrants 54, for holding the levers in adjusted position. The pivotal or swinging movement of the levers 51 will through the meshing engagement of the teeth 49 and the teeth 48 shift the bars 44 and 45 laterally for shifting the beams 38 and 39 laterally to regulate the distance between the scraper or shovel blades 40 and consequently the distance from a row of growing plants, that the shovel blades are positioned.

A suitable tongue supporting bar 57 is attached to the supporting frame 1 and it has a tongue 58 of the ordinary construction attached to the inner end thereof which tongue projects forwardly and is adapted for use in connecting draft animals to the cultivator. Suitable swingle trees 59 are attached to the forward end of the supporting frame 1.

In reducing the invention to practice, certain minor features of construction, combination and arrangement of parts may necessitate alterations to which the applicant is entitled provided such alterations are comprehended within the scope of what is claimed.

What is claimed is:

In a cultivator, a hoe having a rod, means to pivot the rod, means engageable with said rod to oscillate the hoe, a frame, a bearing in which said rod slides, means pivoting the bearing to the frame, and means operable to slide the frame to bring said means and the bearing into contact to raise the hoe.

In testimony whereof I affix my signature in presence of two witnesses.

HENRY C. WILLIAMS.

Witnesses:
Jno. A. Tyson, Jr.,
Jno. A. Tyson, Sr.